(12) United States Patent
Dan et al.

(10) Patent No.: US 6,519,627 B1
(45) Date of Patent: Feb. 11, 2003

(54) SYSTEM AND METHOD FOR CONDUCTING DISCONNECTED TRANSACTIONS WITH SERVICE CONTRACTS FOR PERVASIVE COMPUTING DEVICES

(75) Inventors: Asit Dan, Pleasantville, NY (US); Daniel Manuel Dias, Mohegan Lake, NY (US); Pradeep Janakiraman, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/406,493

(22) Filed: Sep. 27, 1999

(51) Int. Cl.[7] ............................................. G06F 15/16
(52) U.S. Cl. ...................................................... 709/203
(58) Field of Search ............................ 709/203; 705/26, 705/27

(56) References Cited

U.S. PATENT DOCUMENTS

| | | | | |
|---|---|---|---|---|
| 6,148,290 A | * | 11/2000 | Dan et al. ...................... | 705/1 |
| 6,226,692 B1 | * | 5/2001 | Miloushev et al. ......... | 709/316 |
| 6,336,148 B1 | * | 1/2002 | Doong et al. ............... | 709/316 |

* cited by examiner

*Primary Examiner*—David Y. Eng
(74) *Attorney, Agent, or Firm*—Gail H. Zarick

(57) ABSTRACT

A disconnected transaction system for pervasive computing devices includes a service provider server; a pervasive computing device; a communication network; and a service contract downloadable from the service provider server to the pervasive computing device over the communication network during a connected mode, the service contract specifying rules of interaction with a service application associated with the service contract and providing a service provider with a mechanism for validating, upon reconnection to the service provider server, at least one transaction of the service application performed by a user of the pervasive computing device during a disconnected mode.

36 Claims, 10 Drawing Sheets

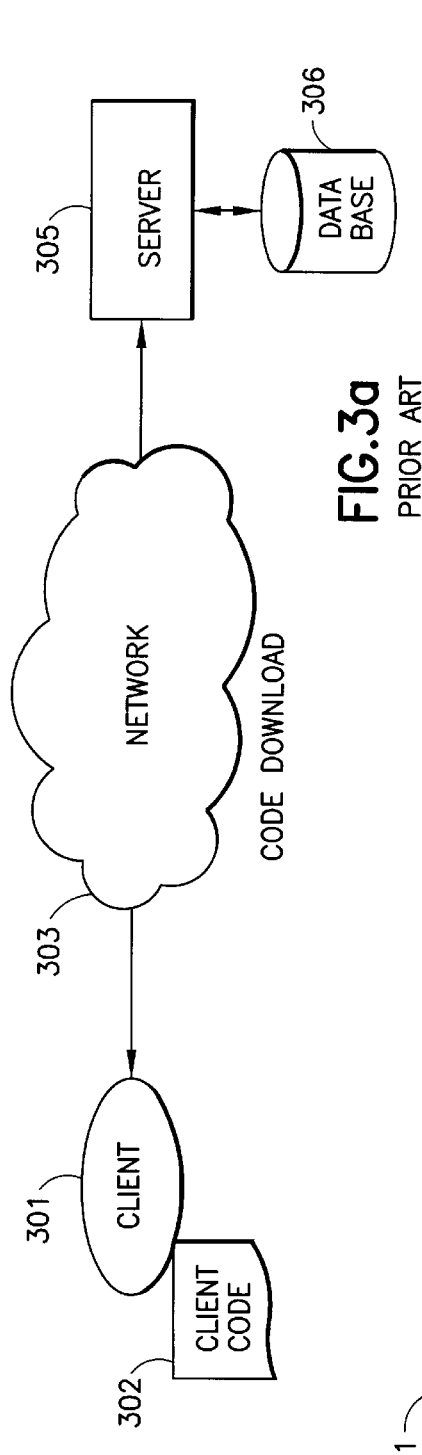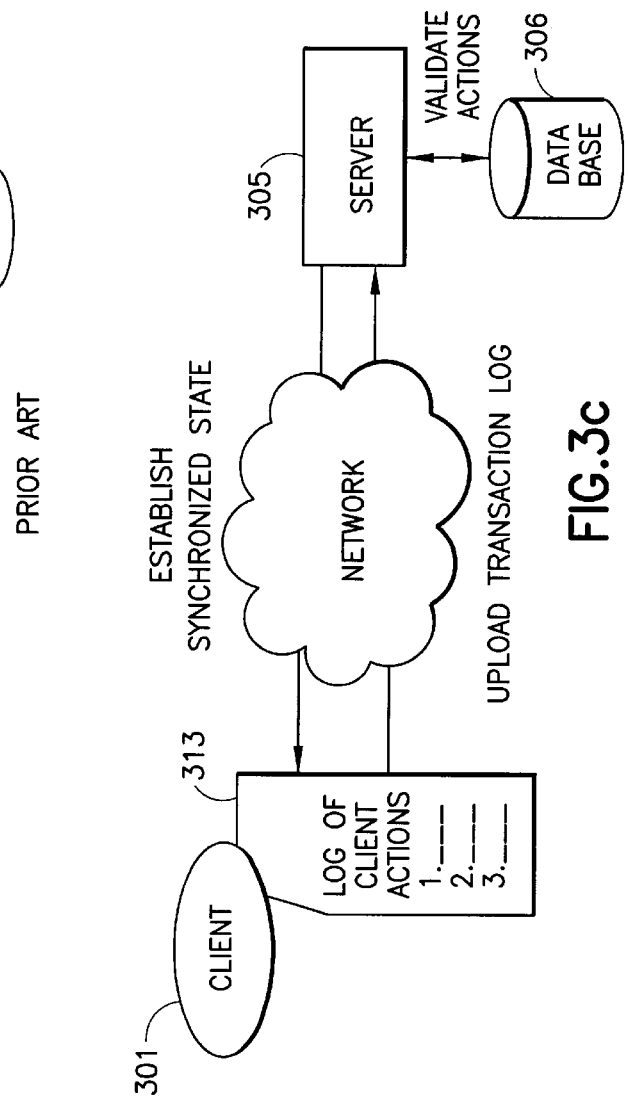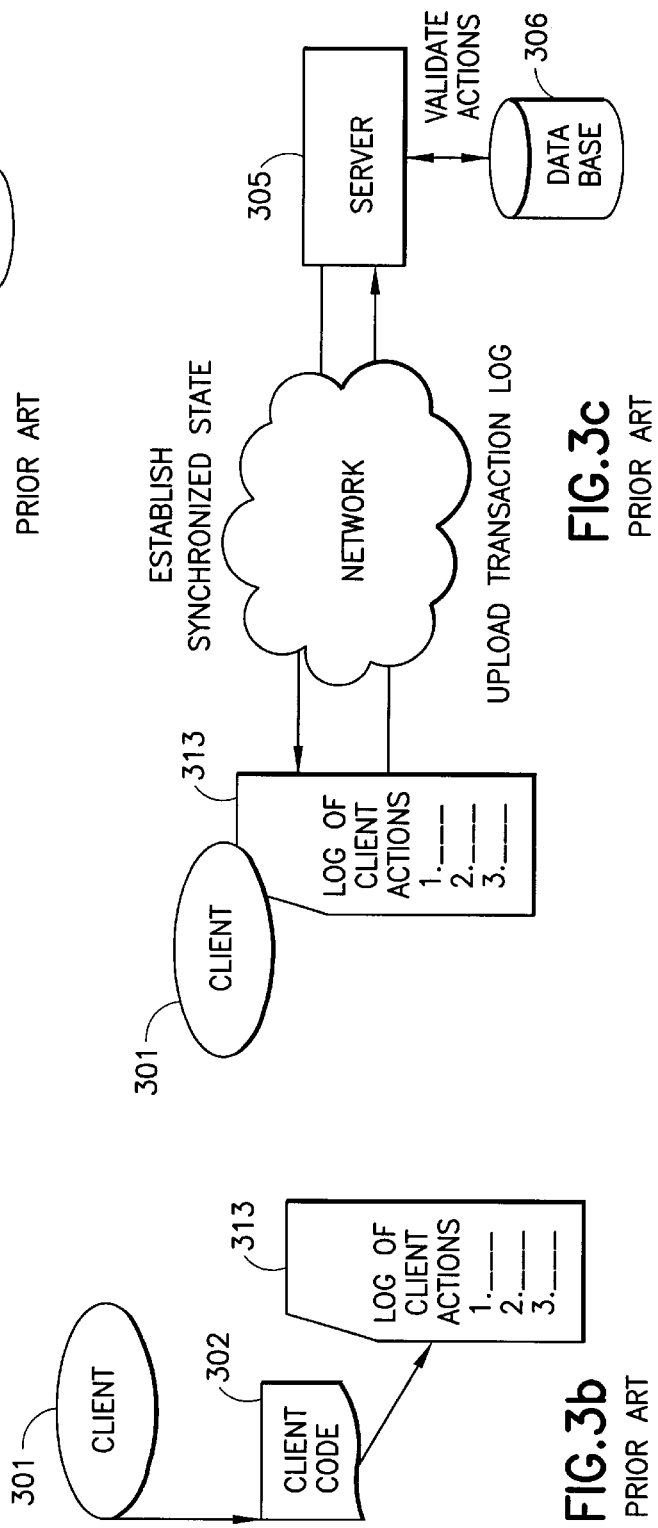
FIG.3a PRIOR ART
FIG.3b PRIOR ART
FIG.3c PRIOR ART

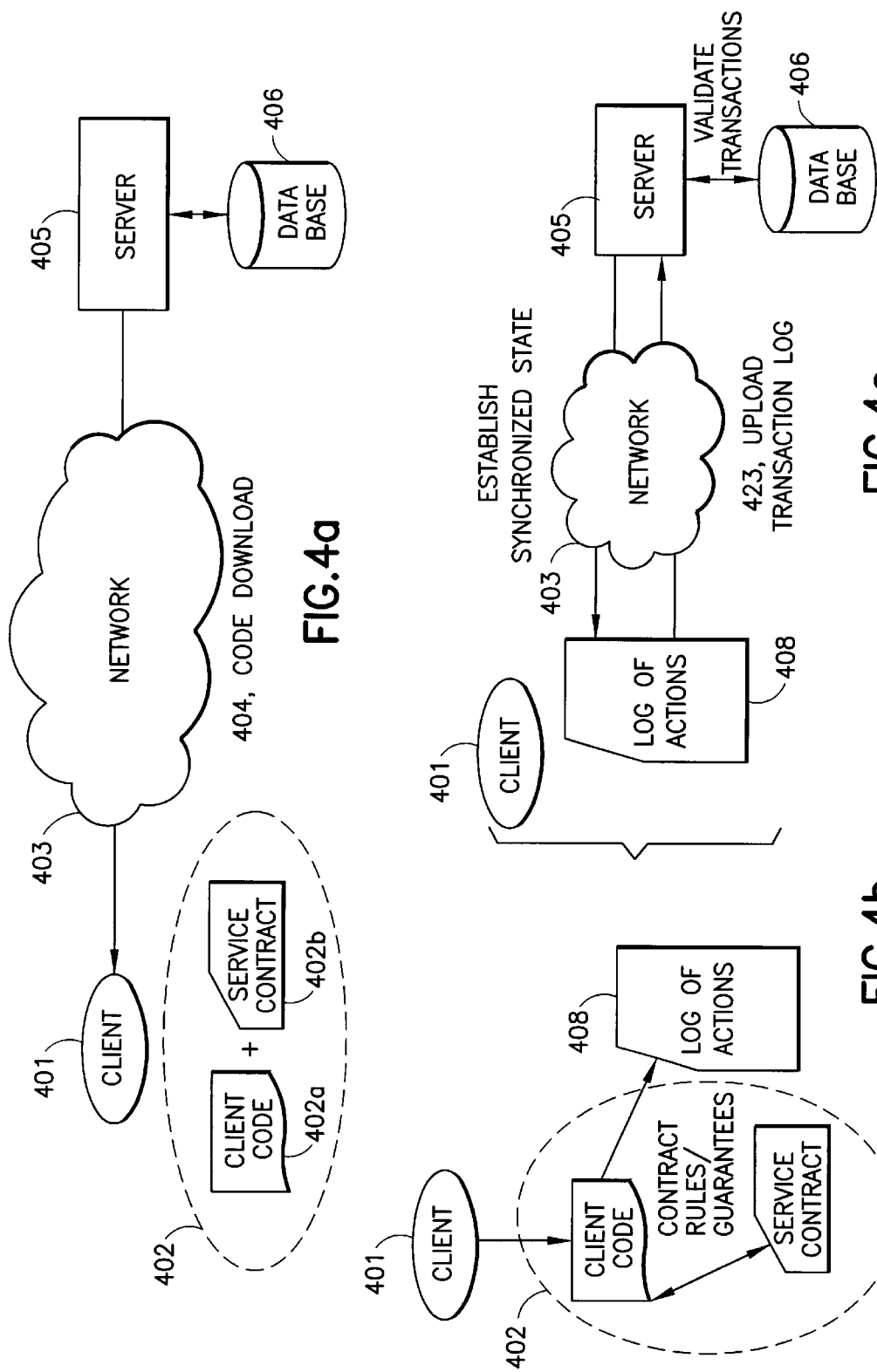

SYSTEM AND METHOD FOR CONDUCTING DISCONNECTED TRANSACTIONS WITH SERVICE CONTRACTS FOR PERVASIVE COMPUTING DEVICES

FIELD OF THE INVENTION

The present invention relates to the use of service contracts in disconnected transactions. Specifically, this invention relates to specifying contracts that enforce rules of interaction with a product/service application for pervasive computing devices while disconnected from a server.

BACKGROUND OF THE INVENTION

There has been a substantial increase in the use of pervasive computing (e.g., hand held) devices to conduct electronic commerce over the last few years. Consequently, there is a need for systems that support disconnected transactions or transactions which, in part, are executed in a disconnected mode. Because pervasive computing devices are most often disconnected from a network (and, thus, any server), system features are required that enable the successful completion of these transactions upon reconnection to an application or resource provider server. Among other functionality, these features must provide for adherence to a set of rules in a pre-established service contract so as to enable the transaction as disclosed in U.S. patent application Ser. No. 09/148,618, filed Sep. 4, 1998, now U.S. Pat. No. 6,148,290 and assigned to the present assignee which is hereby incorporated by reference.

FIG. 1 depicts a conventional client-server interaction system model. The clients (101, 102), being any type of computer system, are connected to a server or servers 140 via a network 130 such as the Internet or an intranet. In this model, the clients (101, 102) execute a part of an application logic where the associated application code is either pre-installed in the clients (101, 102) or downloaded from the server 140 prior to execution. The overall application is designed by appropriately partitioning the application logic across the clients (101, 102) and the server 140. Periodic upgrades may also be shipped by the server 140 to the clients (101, 102). In any case, the clients are equipped with a program or client code (111, 112) that executes locally and provides a responsive interface for interaction with the server 140. The client code (111, 112) establishes contact with the server 140 through the network. For example, a simple client interface could be provided by the client code (111, 112) for interacting with several applications on the server, e.g., a VM Client application can be used to interact with several server applications like Email, HR forms etc. The client code (111, 112) makes method invocations to the server 140 and receives responses therefrom. For state-keeping purposes, the interactions could be logged at the client and/or the server depending on the features and logic of the client code. Examples of such distributed client-server applications are distributed file systems, transaction processing, and groupware.

FIG. 2 depicts a conventional dynamic client system, where the client code 201 is dynamically downloaded to the client 200 when the client establishes a connection with the server 230, rather than being statically pre-installed at the client and used for several interactions. That is, the interfaces provided to the user are composed at the server 230 and presented to the client 200 as a program that executes on the client. This code 201 is downloaded at run-time and, after the interactions, the code is deleted from the client. An example of this scenario is an Applet that is downloaded via the network 220 onto the client 200 and executes thereon by interacting with the server 230 making method invocations and receiving responses in return. The Applet is not permitted to write to the client's file system and has certain other security restrictions. Another example of this model could be an HTML form that shows up on the client's web browser when it opens a connection to the server. In both cases, the interactions are synchronous so that any disconnection with the server 230 would put the state of the interactions in an inconsistent state, unless the server 230 deploys mechanisms for logging and providing reliability and fault-tolerant functions. For example, a user at a client 200 may attempt to purchase goods through the web and a shopping cart may be filled with the user's selections. In this scenario, the state of the interactions could be lost if the connection to the server 230 is broken at some instance prior to completing the purchase. However, in this model, if the server 230 maintained the state of interactions, the interaction could be resumed by synchronizing the client state to the server state. This server state maintenance, of course, requires the connected nature of the transaction.

Under a model of pervasive computing, clients may follow a mode of disconnected operation and periodic synchronization. FIG. 3a depicts an example of this model where client code 302 is downloaded from a database 306 of a server 305 and installed on a client 301 via a network 303. The client 301 can be any pervasive (or mobile) computing device such as a hand held device, a notebook computer or some other pervasive electronic device with processing capability, storage, I/O mechanisms and a communication system. At some subsequent time, the client 301 is disconnected from the server 305 and the client continues to operate on data in a disconnected mode. When the client 301 executes the code 302 in the disconnected mode as shown in FIG. 3b, a log 313 of all disconnected operations or actions is created by the client. Thus, in this pervasive computing model, the state of the disconnected operations is maintained on the client only. The client 301 periodically connects back to the server 305, as shown in FIG. 3c, to synchronize the client and server states in order to commit the transaction. In other words, the log 313 of the disconnected actions is uploaded to the server 305, and the server 305 executes each of these actions resulting in a change to its database resources 306. If these actions are completed successfully by the server 305, then the transaction is successfully completed. But due to changes in the state of the server 305, some of the actions will not be executed by the server 305 and the transaction will, therefore, fail. For instance, in the event that the data on the server is shared and accessed by more than one client, the data is free to change according to the actions that the other clients might perform. An example of this might be a movie ticket database which might be downloaded by a client. There may be clients that also have downloaded this database and reconnected in order to book tickets. In that case, if seats are sold on a First-Come-First-Served basis, when the client tries to commit a transaction for a seat which has been booked by some other client, the transaction fails because the data on this client is no longer current or, in other words, the data or the state at the server has changed. Thus, the client 301 would then have to re-attempt the transaction by receiving the current state of the server 305.

Therefore, pervasive computing clients currently download data and attempt to execute transactions on the data without an understanding of the changes taking place at the server when they are disconnected. Thus, there is no guarantee of the validity of the data and the success of a transaction until the transaction is sent to the server and committed. Furthermore, users can tamper with data in the disconnected mode so that, upon reconnection, the transaction is erroneously completed. For instance, the price of a product could be adjusted so as to reduce the cost to the user. Thus, due to the disconnected nature of transactions in the pervasive computing arena and the associated characteristics that make transaction and data validity questionable, there is a need for a system and method for validating actions taken in the disconnected mode.

Service contracts can be used to facilitate the outcomes of transactions by requiring adherence to the guidelines outlined in the contract. By stating the guidelines for conducting actions, the outcomes can be characterized in an unambiguous way. This concept of guaranteed outcomes based on guidelines is attractive if applied in the context of disconnected transactions. Since pervasive computing clients operate on data without awareness of the changes that might take be taking place on the server, it becomes essential to make guarantees about the validity of the clients' disconnected actions, based on certain conditions such as timeliness and other rules that the resource provider might decide appropriate to ensure the same success of transactions if the clients were connected and aware of the state of the server. Thus, there is a need for a system and method of enforcing rules of transactions, provided by a service contract, in a disconnected mode.

SUMMARY OF THE INVENTION

The present invention provides for a system of using service contracts to enforce rules of transactions performed when a pervasive computing client is disconnected from the server. Preferably, a service contract would be packaged along with the presentation logic to specify the interaction behavior of the end user on the data objects available in the disconnected mode.

According to the present invention, the service contract outlines the rules that the server specifies as valid actions on the applicable data objects. Compliance with the contract, guidelines is facilitated by an associated client program which extracts the appropriate rules and incorporates the appropriate user interface features. A user can download one such service contract and program and interact with the application data even while disconnected from the server. During the disconnected mode, the client program presents the appropriate interaction screens for operating on the data consistent with the rules of the contract during operations on the data objects.

When the client connects back to the server, the prepared transaction (in the form of an action log) is uploaded to the server and the server verifies the transaction(s) based on the contract. Depending on the rules of the contract, the transaction(s) either succeeds or fails. The transaction could fail, for instance, if the client tampered with the program while disconnected in an attempt to perform certain actions which were not permitted in the contract. Comparison to the service contract at the server allows detection of such tampering by the user.

The present invention thus provides a system and method for providing a service where one or more parties can interact with the service using a service contract which unambiguously specifies the rules of interaction. Since, in a preferred embodiment, the contracts are drafted and implemented by the provider, the user at the client need only choose the product or service and associated contract that suits his needs. The user can be assured of a successful transaction if he abides by the rules outlined in the contract.

This invention is very useful for enabling electronic commerce (e-commerce) using pervasive computing devices. There has been a significant increase in the use of hand held devices for conducting transactions in a mobile context. Since service contracts clearly spell out the rules imposed by the server, the client only needs to abide by the contract to achieve a successful transaction. With this invention, the server can issue guarantees to the clients by specifying service contracts. By abiding to the contracts, the clients have significantly higher chances of successful transactions.

Specifically, the present invention provides a method for conducting disconnected transactions, between a pervasive computing device and a server, relating to a service application, the method including the steps of: receiving, at the pervasive computing device, a service contract from the server during a connected mode, the service contract specifying rules of interaction with the service application in a disconnected mode; executing, with the pervasive computing device, at least one transaction of the service application in the disconnected mode; and sending transaction information, in response to the executing step, to the server during a reestablished connected mode, whereby the at least one transaction is recorded as valid if compliance with the rules of interaction are verified by the server.

The method can also include the step of receiving a service program which enables a user of the pervasive computing device to interact with the service application consistent with the rules of interaction. The service program can also provide, to the user, user interfaces for interaction, program logic for service application actions, security features specified by the service contract and/or alerts which facilitate successful completion of the at least one transaction.

Furthermore, the service program can be written to only enable interaction with the service application consistent with the rules of interaction of the service contract. The service program can also include a common module written to enable interaction with the service application consistent with the rules of interaction of a plurality of service contracts when combined with specialized modules written for each service contract.

The method of the present invention can also include the step of receiving a service contract with an identification code identifying the service application or server.

In one embodiment, the executing step includes the step of logging the at least one transaction as log data. The sending step can also include the step of sending the log data to the server during a reestablished connected mode. The reestablished connection mode can include a reestablished network-connected mode.

Another aspect of the present invention provides a program storage device, readable by a machine, tangibly embodying a program of instructions executable by the machine to perform method steps for conducting disconnected transactions, between a pervasive computing device and a server, relating to a service application, the method including the steps of receiving, at the pervasive computing device, a service contract from the server during a connected mode, the service contract specifying rules of interaction with the service application in a disconnected mode; executing, with the pervasive computing device, at least one transaction of the service application in the disconnected mode; and sending transaction information, in response to the executing step, to the server during a reestablished connected mode, whereby the at least one transaction is recorded as valid if compliance with the rules of interaction are verified by the server.

Another aspect of the present invention includes a system for conducting disconnected transactions with a server relating to a service application, including: a device for receiving, at the pervasive computing device, a service contract from the server during a connected mode, the service contract specifying rules of interaction with the service application in a disconnected mode; a device for executing, with the pervasive computing device, at least one transaction of the service application in the disconnected mode; and a device for sending transaction information, in response to the executing step, to the server during a reestablished connected mode, whereby the at least one transaction is recorded as valid if compliance with the rules of interaction are verified by the server. The system can also include a device for receiving a service program which enables a user of the pervasive computing device to interact with the service application consistent with the rules of interaction.

In another aspect, the present invention includes a method for facilitating disconnected transactions, between a pervasive computing device and a server, relating to a service application, the method including the steps of: receiving, from the pervasive computing device a request for service application information; presenting one or more service application options and associated service contracts to the pervasive computing device; receiving, from the pervasive computing device, a service application selection; sending, to the pervasive computing device, a service contract associated with the service application selection, the service contract specifying rules of interaction with the service application in a disconnected mode; receiving, from the pervasive computing device, transaction information logged during the disconnected mode; and validating the transaction information.

The method can also include the step of sending, to the pervasive computing device, a service program which enables a user of the pervasive computing device to interact with the service application consistent with the rules of interaction. The service program could provide, to the user, user interfaces for interaction. The service program could also provide, to the user, program logic for service application actions. Also, the service program could provide, to the user, security features specified by the service contract to prevent tampering. Finally, the service program could provide, to the user, alerts which facilitate successful completion of the at least one transaction.

In one embodiment, the service program is written to only enable interaction with the service application consistent with the rules of interaction of the service contract. The service program could also include a common module written to enable interaction with the service application consistent with the rules of interaction of a plurality of service contracts when combined with specialized modules written for each service contract.

The service contract sending step could also include the step of sending a service contract with an identification code identifying the service application or the server. The validating step can include the step of comparing the transaction information to the rules of interaction specified by the service contract.

Another aspect of the present invention provides a program storage device, readable by a machine, tangibly embodying a program of instructions executable by the machine to perform method steps for facilitating disconnected transactions, between a pervasive computing device and a server, relating to a service application, the method including the steps of: receiving, from the pervasive computing device a request for service application information; presenting one or more service application options and associated service contracts to the pervasive computing device; receiving, from the pervasive computing device, a service application selection; sending, to the pervasive computing device, a service contract associated with the service application selection, the service contract specifying rules of interaction with the service application in a disconnected mode; receiving, from the pervasive computing device, transaction information logged during the disconnected mode; and validating the transaction information.

Yet another aspect of the present invention provides a server system for facilitating disconnected transactions in a pervasive computing device relating to a service application, including: a device for receiving, from the pervasive computing device a request for service application information; a device for presenting one or more service application options and associated service contracts to the pervasive computing device; a device for receiving, from the pervasive computing device, a service application selection; a device for sending, to the pervasive computing device, a service contract associated with the service application selection; a device for receiving, from the pervasive computing device, transaction information logged during a disconnected mode; and a device for validating the transaction information.

A final aspect of the invention provides a disconnected transaction system for pervasive computing devices including: a service provider server; a pervasive computing device; a communication network; and a service contract downloadable from the service provider server to the pervasive computing device over the communication network during a connected mode, the service contract specifying rules of interaction with a service application associated with the service contract and providing a service provider with a mechanism for validating, upon reconnection to the service provider server, at least one transaction of the service application performed by a user of the pervasive computing device during a disconnected mode.

The service contract preferably specifies unambiguous rules of interaction with downloaded transaction information in the disconnected mode. The system can further include a service program downloadable from the service provider server to the pervasive computing device over the communication network during a connected mode, the service program adapted to enable a user of the pervasive computing device to interact with the service application consistent with the rules of interaction. The service program can include user interfaces for interacting with the transaction information, implementation logic which presents the user interfaces and computes the results of the actions, security features that enable identification of the service provider server or the service contract, and/or alert features to assist the user in making decisions when the pervasive computing device is in the disconnected mode.

BRIEF DESCRIPTION OF THE DRAWINGS

The present invention will be better understood by referring to the drawings wherein:

FIG. 3 is a schematic diagram of conventional disconnected operations in the pervasive computing field;

FIG. 4 is a schematic diagram depicting a system for performing disconnected operations utilizing service contracts in accordance with an embodiment of the present invention;

DETAILED DESCRIPTION OF THE PREFERRED EMBODIMENT

Figure 1:
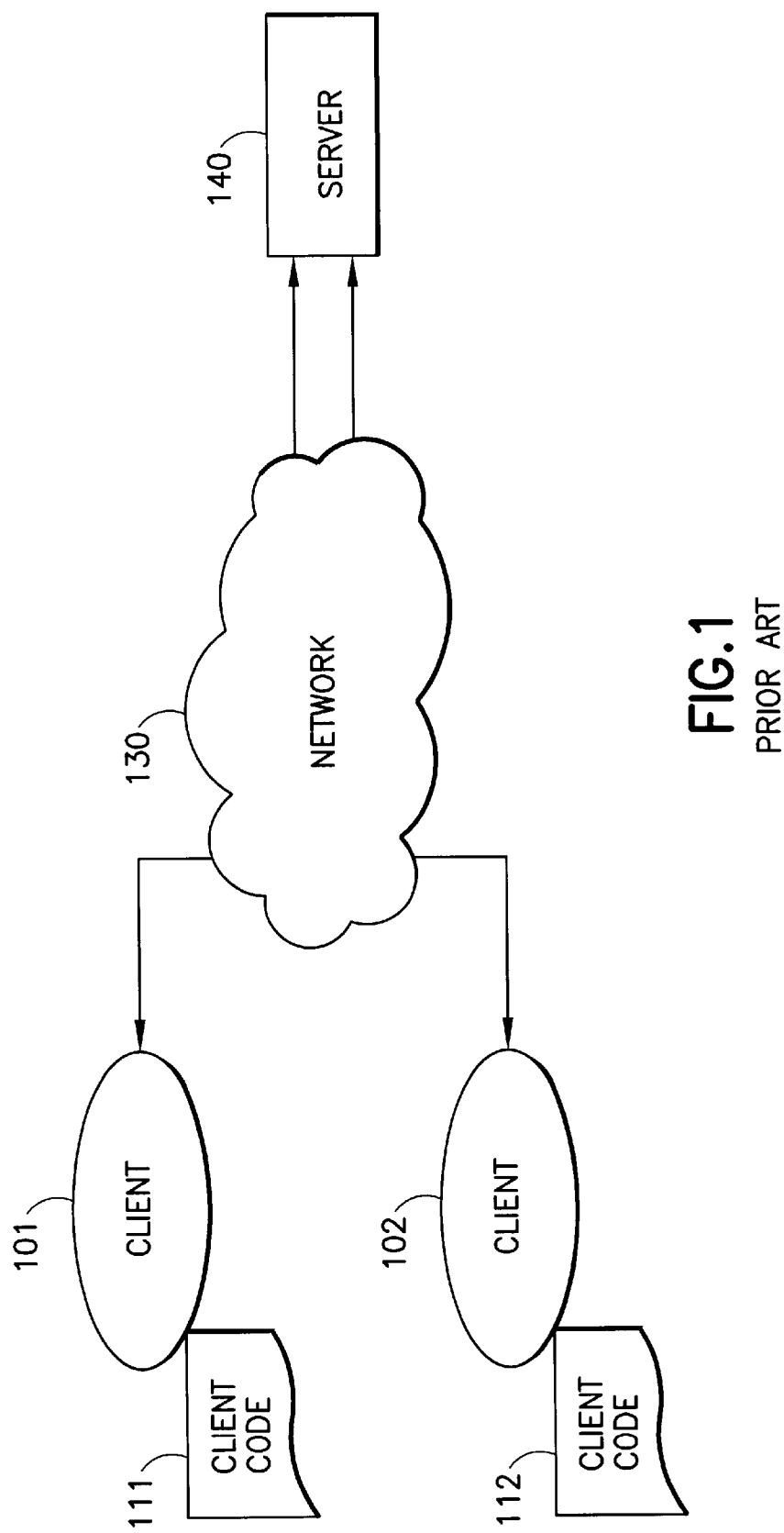
FIG. 1 is a schematic diagram of a conventional client-server system.
Figure 2:
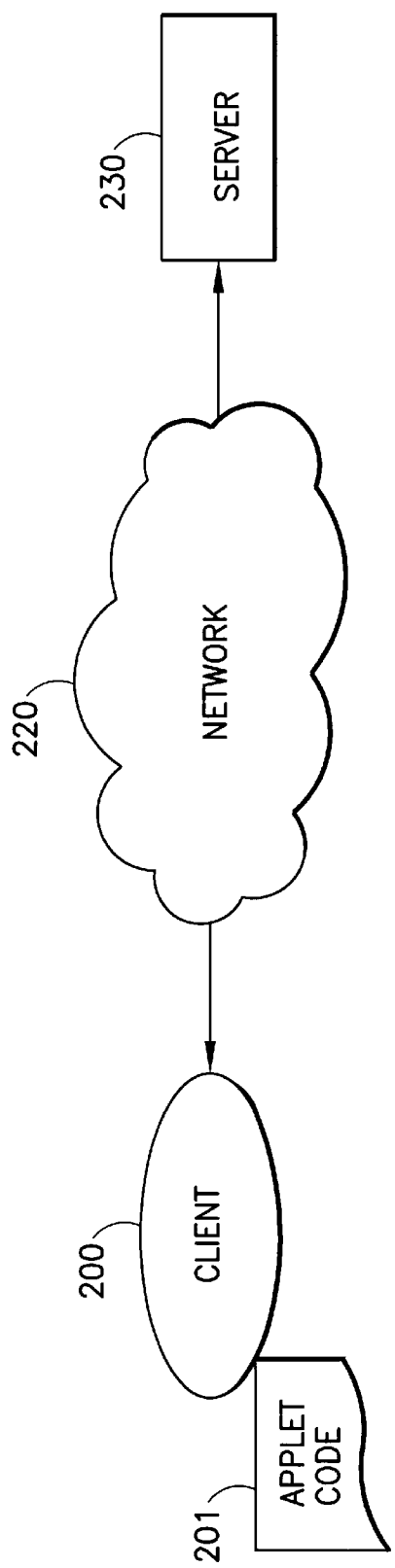
FIG. 2 is a schematic diagram of a conventional dynamic client system.

In an embodiment of the present invention shown in FIG. 4, a downloadable service contract is preferably defined by the resource provider of the server 405 for each particular product or service that the resource provider plans to make available for clients (and heir associated users) in a catalog or otherwise. The server 405 presents a service contract which outlines permitted actions, their sequences and the associated rules for each of these actions. The client 401 downloads a combination of code 402, operates on the data when disconnected from the server 405 and later connects back to commit the transaction.

As shown in FIG. 4a, the combination of code 402 downloaded from a database 406 of the server 405 includes the service contract 402b which outlines actions and rules associated with the actions and executable service program (or client code) 402a that provides interfaces for interacting with application data that is packaged therein, thereby enforcing the service contract 402b by maintaining the contract guidelines within its logic.

When the client 401 interacts with the application data and begins performing actions on the data in a disconnected state, a log 408 of these actions is created. The log format is preferably standardized and specified in the service contract. When the client 401 later reconnects, a synchronized state is established and the log 408 is uploaded to the server 405 as shown in FIG. 4c. The server 405 then validates each of the actions in the log 408 with its stored contract guidelines database 406. The database 406 could simply be a copy of the service contract that was downloaded to the client. If the client 401 has conformed to the contract and has not tampered with the code or data, then the actions are executed on the database 406. However, if the contract 402b has been violated in some manner, the transaction is considered a failure and the client 401 must start over again by downloading a new code combination 402 and by re-trying execution, conforming to the rules of the contract.

Figure 8:
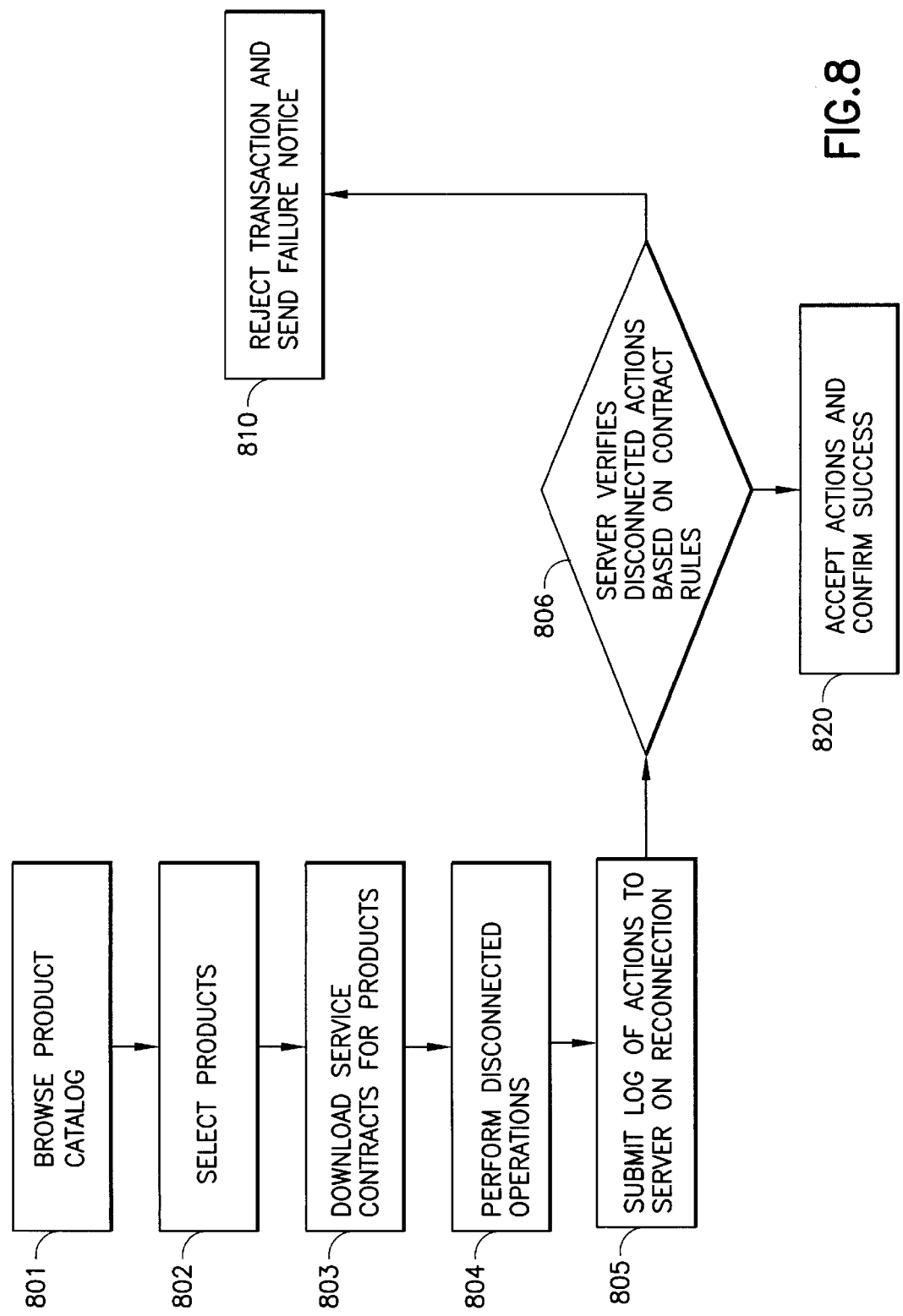
FIG. 8 is a flow diagram depicting the method steps of an embodiment of the present invention.
Figure 9:
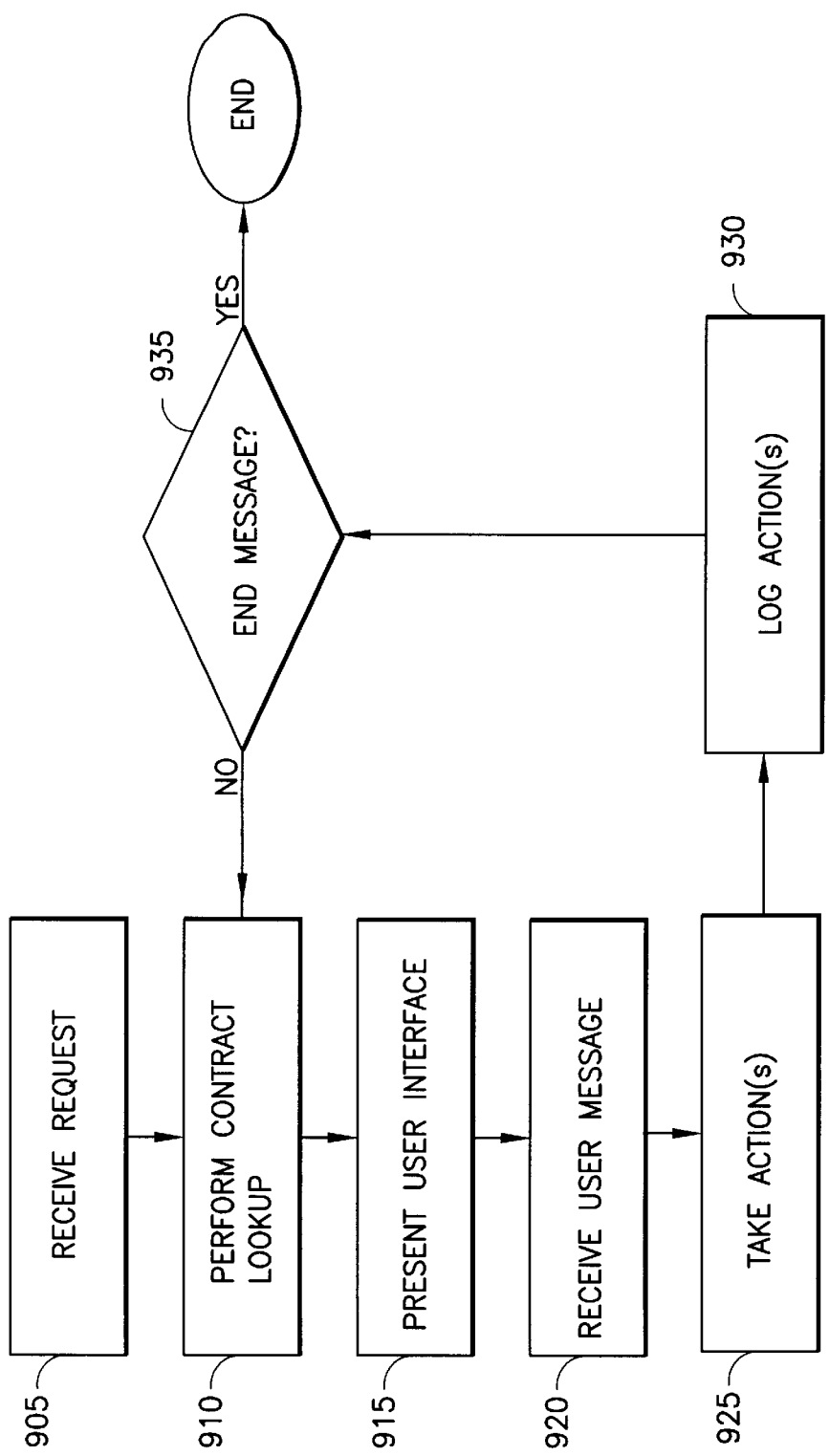
FIG. 9 is a flow diagram depicting the service program logic that is executed in the disconnected mode in accordance with an embodiment of the present invention.
Figure 10:
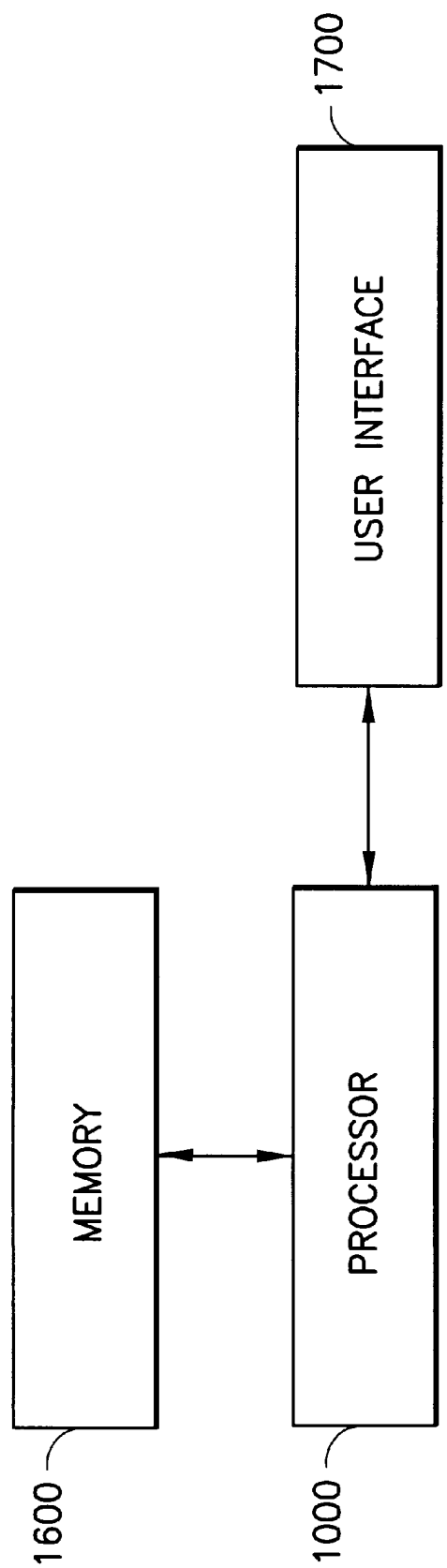
FIG. 10 is a block diagram of an illustrative hardware implementation of one or ore of the components of the system according to an embodiment of the present invention.

FIG. 10 depicts an illustrative hardware implementation that may be respectively employed, for example, by the server 405 and/or the client 401. In this particular implementation, a processor 1000 for controlling and performing the various operations associated with the illustrative systems of the invention depicted in FIGS. 4–9, is coupled to a memory 1600 and a user interface 1700. It is to be appreciated that the term "processor" as used herein is intended to include any processing device, including a CPU (central processing unit), which may be utilized in a client computer, server computer, or any other computer employed in conjunction with the invention. Also, the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), a flash memory, etc. In addition, the term "user interface" as used herein is intended to include, for example, one or more input devices, e.g., keyboard, for inputting data to the processing unit, and/or one or more output devices, e.g., CRT display and/or printer, for providing results associated with the processing unit. Also, it is to be understood that one or more processing devices within the network may share associated resources.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements and operations illustrated in the figures may be implemented in various forms of hardware, software, or combinations thereof, e.g., one or more special purpose processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Figure 5:
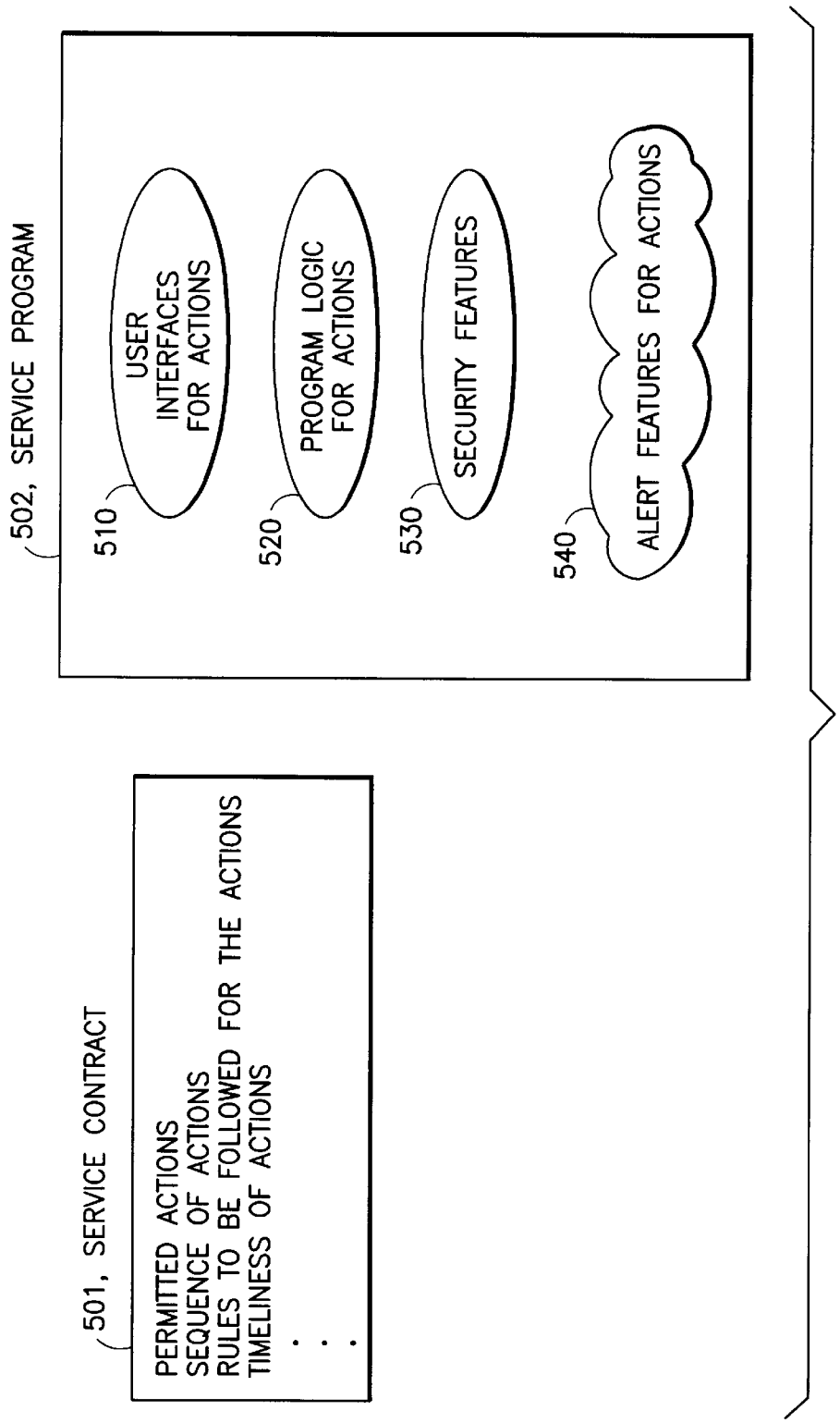
FIG. 5 depicts a downloadable module which includes a service contract and service program in accordance with an embodiment of the present invention.

FIG. 5 illustrates an embodiment of the downloadable code combination 402 consisting of a service contract 501 and the program 502 that facilitates compliance with guidelines of the contract 501 in the disconnected mode. The contract 501 contains actions permitted to be executed by the client in the disconnected mode and the permitted sequence of the actions. The contract also contains rules and conditions for each of the permitted actions and, optionally, specifies the timeliness of the actions so that alerts or prompts can be used to assist the user in successfully completing transactions.

As indicated hereinabove, it is preferable that the service contract is first drafted by the resource manager. This is because the server usually has information about the rate of change of data, the number of clients that access its resources, etc. Hence, the server is in a good position to estimate contract guidelines about how long data that is downloaded by a client could be valid, how much of its resources it is willing to hold for the time period guarantees, etc. However, the contract can be joinly created or negotiated by the resource manager and the user(s). The contract defines operations or actions such as allowable sequences of interaction, valid and invalid timings for interactions, boundary conditions for operations on data objects, conditions under which the contract would be invalid, canceled etc. In other words, the contract provides a self-enforcing mechanism for managing the service transactions by providing enforcement code according to the rules of interaction included in the contract.

A "service" contract and associated "service" application are meant herein to relate to product offerings as well as service offerings. For example, the service contract could be for an on-line store, which includes a set of items that can be ordered, the prices of these items, and the time-frame for which these prices are valid. It could also include constraints such as bounds on the number of items or aggregate purchase price. The service contract could include code for operations or actions on the data such as ordering the item(s), canceling orders, query of state of orders, etc. It can also include code for alerts, such as imminent expiry of an order (or contract) unless the user connects to the network. In addition, the contract will include permissible operations and terms and conditions after the user reconnects to the network.

The service program 502 (or client code) provides features for enabling the user to interact while abiding by the rules of the contract 501 at every step of the disconnected transaction. The program 502 preferably includes the user interfaces 510 that are provided to interact with the application data in the disconnected mode, the code 520 that implements the logic for these actions, the security features 530 that are provided to help in settling disagreements between the client and the resource manager with regard to the contract guidelines, and alerts 540 that may be provided by the service provider to assist in the successful completion of the transactions. The program 502 presents the user interfaces to the client in a manner that is intended in contract 501 and the code 520. For example in a airline reservation scenario, the cancellation screen cannot be invoked before making a reservation. Thus, a simple program would be able to enforce a multi-step execution involving business rules and internal methods where the rules specify how the next method is to be selected.

In another embodiment of the present invention, the user can write his own service (or client) code consistent with the service contract rules. That is, the server may download only the service contract. If the service contract terms are properly specified, the user can use the contract to create user interfaces and to implement, consistent with the contract guidelines, the application including log creation. In this embodiment, it is especially important for the server, upon reconnection with the client, to check the action log for proper enforcement. Only if the user followed the contract rules in writing the code and performing the actions, will the transaction(s) be validated.

Figure 6:
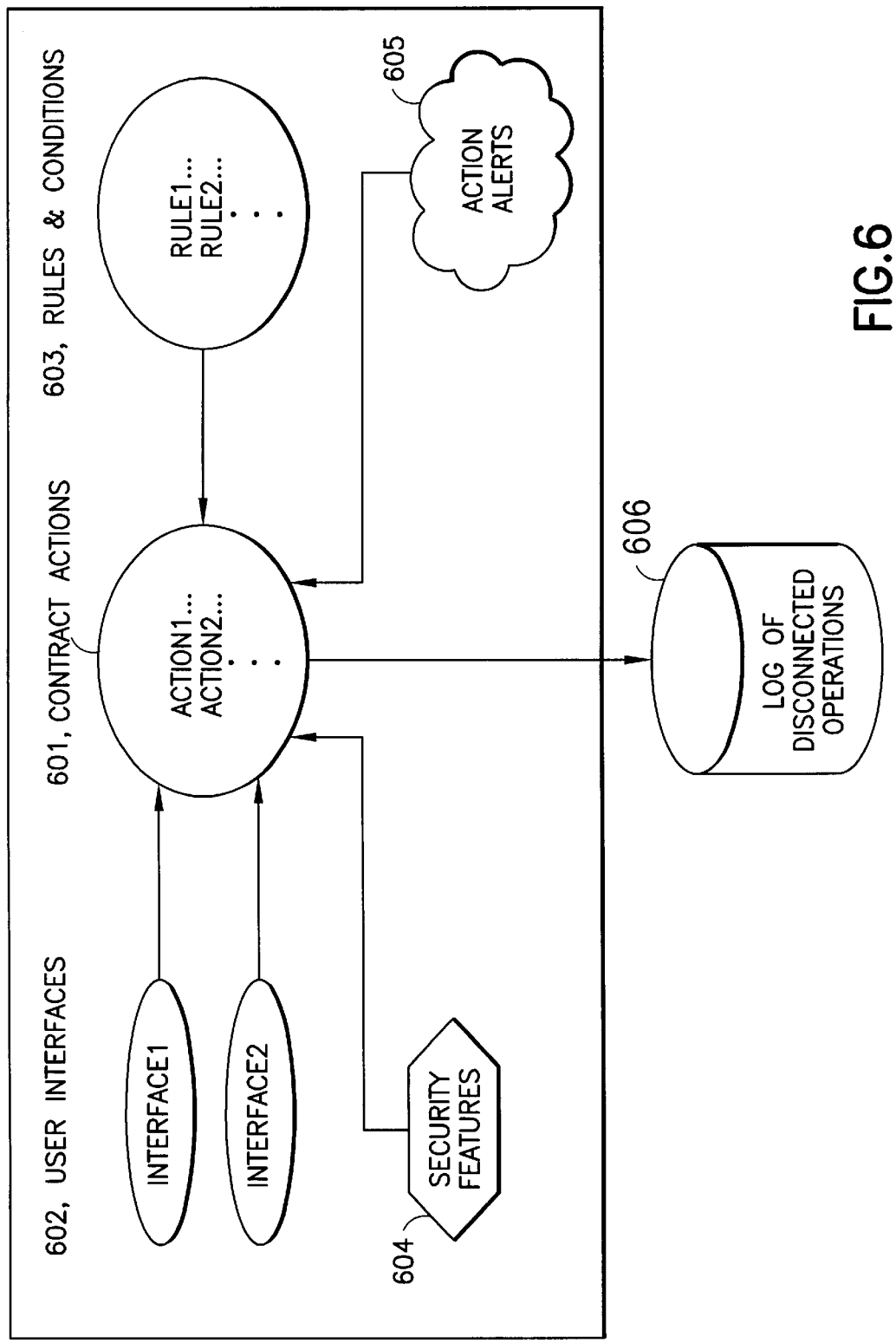
FIG. 6 describes the disconnected mode operations on a downloaded product catalog with service contracts in accordance with an embodiment of the present invention.

Initially, the service program 502 presents the user with one or more screens for browsing the products or services, e.g., for off-line purchase. FIG. 6 illustrates how the operations or actions are carried out in the disconnected mode. The screens or user interfaces 602 are provided by the program for interacting with the application data. Once a product or service has been selected, another screen could be provided for making a purchase. Subsequently, the program could allow the user to either undo the previous action or perform additional purchases for the same product.

In one embodiment, at each stage, the rules and conditions 603 associated with each of the actions 601 are extracted from the service contract. Otherwise, the extraction can be completed at once at the start of the service program execution. As indicated hereinabove, rules may relate to the timeliness of the transaction. For instance, they may specify completion of a transaction within a specified amount of time. The conditions that are packaged with the rules may specify boundaries within which a particular action may be considered valid. For example, here might be a condition that specifies the limit on the number of products that could be bought at a given price using the provided catalog. These rules could get quite complex. For example, a complex rule might include a price for a product that would be applicable if the transaction completed within a particular date, and another price that would be used if not and so on.

The server can package alerts 605 along with the program to prompt the user to commit certain actions in a timely manner. For example, there might be a reminder alert that prompts the user to connect to the server before the contract times out or complete an open transaction so that the transaction may complete successfully. The alerts could be very useful to inform users of important price information associated with the timeliness of the action as discussed hereinabove. For example, the alert could prompt the user to connect back to the server to get a preferred price deal on a product within a particular date, and mention that the sale price would be different otherwise. These alerts could have a direct impact on the success of the transactions, since clients are likely to forget the exact terms of the contract, without a reminder.

Security features 604 aid in settling disagreements between the client and the resource manager with regard to the contract guidelines. For example, the client's copy of the contract which is downloaded may contain an identification code such as a digital signature or a watermark identifying the server, service application or service contract. If there is a discrepancy with regard to the disconnected operations and the contract guidelines (such as when the server refuses to confirm the disconnected transaction(s), the identification code can be used to prove the contract guidelines (at least as they existed upon download). Besides enforcing these security policies in the disconnected mode, the rules are also checked with the corresponding copy of the contract at the server when the user connects back to the server. If rules were violated or the contract was tampered with, it would be detected at this stage and the transaction would be considered void.

Finally, as discussed hereinabove, a log 606 of disconnected actions performed is maintained. The program logs each action (time, values) and numbers actions in a sequential manner including time-out notifications which are provided as alerts. The objective of the log is to maintain the operations that have been performed on the data so as to reflect the changes serially and appropriately on the server during reconnection.

Figure 7:
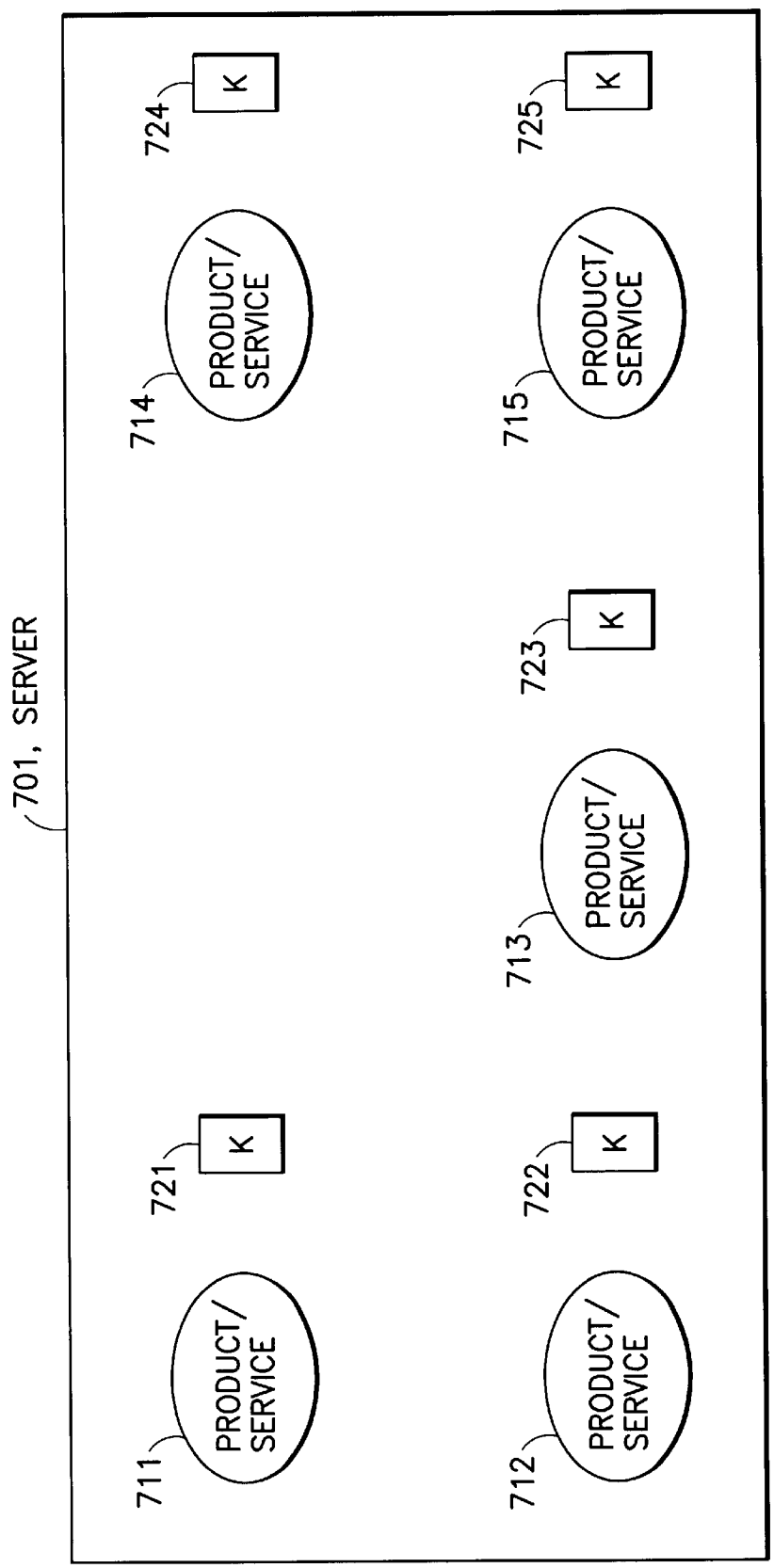
FIG. 7 depicts the catalog of contracts that are available at the server in accordance with an embodiment of the present invention.

FIG. 7 illustrates one embodiment in which server 701 presents the service contracts along with the associated products/services. The server 701 has several products/services listed in a catalog. On the client screen, product/service hyperlinks (711–715) are provided along with contract hyperlinks (721–725) for each product/service. After browsing the products by clicking on the hyperlinks (711–715) for further descriptions, the user may click on the contract hyperlinks (721–725) to understand the terms of the associated service contracts. If the terms are acceptable, the user may choose a download button to download the service contract and associated service code for transaction processing in a disconnected mode.

In one embodiment of the present invention illustrated in FIG. 8, the user begins, in step 801, by requesting (browsing or otherwise) product or service catalogs from the server via the World Wide Web or some other networking application or architecture when connected thereto, as described hereinabove. Next, the user selects one or more products or services that are of interest taking into consideration their associated service contracts, in step 802, and optionally composes a shopping cart for additional selections. Once the user's selections are made, in step 803, the user downloads the service contracts (and associated service code) corresponding to the selected product(s) or service(s). In step 804, the client performs actions associated with the product(s) or service(s) in the disconnected mode which are regulated by the contract and logged as described hereinabove. Finally, in step 805, to complete the transaction, the client connects back to the server and uploads the log of the actions taken in the disconnected mode to the server. In step 806, the server verifies the disconnected actions based on the contract rules. If any of the actions are determined to be inconsistent with the rules, the server rejects the transaction and sends a failure notice to the client. If the actions were all consistent with the rules (and no tampering was otherwise discovered), the actions are accepted and a message is optionally sent to the user confirming transaction success.

FIG. 9 is a flow diagram depicting the service code logic that is executed in the disconnected mode in accordance with an embodiment of the present invention. In step 905, a request to begin is received from the application program, the user or otherwise. In step 910, the service code performs a lookup of the service contract. In response to the lookup, a user interface is presented to the user in step 915. In the first user interface, the service contract is optionally displayed to remind the user of the rules and conditions. In step 920, a message is received from the user in response to the user's choosing some action presented on the display as an option. In step 925, some action is taken and in response to the received message. The actions taken are then logged in step 930. If, in step 935, an end message is received, the process ends. If no end message is encountered, the process continues in step 910.

Now that the invention has been described by way of a preferred embodiment, various modifications and improvements will occur to those of skill in the art. Thus, it should be understood that the preferred embodiment is provided as an example and not as a limitation. The scope of the invention is defined by the appended claims.

We claim:

1. A method for conducting disconnected transactions, between a pervasive computing device and a server, relating to a service application, the method comprising the steps of:
   receiving, at the pervasive computing device, a service contract from the server during a connected mode, the service contract specifying rules' of interaction with the service application in a disconnected mode;
   executing, with the pervasive computing device, at least one transaction of the service application in the disconnected mode; and
   sending transaction information, in response to the executing step, to the server during a reestablished connected mode, whereby the at least one transaction is recorded as valid if compliance with the rules of interaction are verified by the server.

2. The method of claim 1 further comprising the step of receiving a service program which enables a user of the pervasive computing device to interact with the service application consistent with the rules of interaction.

3. The method of claim 2 wherein the service program receiving step comprises the step of receiving a service program which provides, to the user, user interfaces for interaction.

4. The method of claim 2 wherein the service program receiving step comprises the step of receiving a service program which provides, to the user, program logic for service application actions.

5. The method of claim 2 wherein the service program receiving step comprises the step of receiving a service program which provides, to the user, security features specified by the service contract.

6. The method of claim 2 wherein the service program receiving step comprises the step of receiving a service program which provides, to the user, alerts which facilitate successful completion of the at least one transaction.

7. The method of claim 2 wherein the service program is written to only enable interaction with the service application consistent with the rules of interaction of the service contract.

8. The method of claim 2 wherein the service program includes a common module written to enable interaction with the service application consistent with the rules of interaction of a plurality of service contracts when combined with specialized modules written for each service contract.

9. The method of claim 1 wherein the service program receiving step comprises the step of receiving a service contract from the server during a network-connected mode.

10. The method of claim 1 wherein the service program receiving step comprises the step of receiving a service contract with an identification code identifying the service application or server.

11. The method of claim 1 wherein the executing step comprises the step of logging the at least one transaction as log data.

12. The method of claim 11 wherein the sending step comprises the step of ending the log data to the server during a reestablished connected mode.

13. The method of claim 12 wherein the reestablished connection mode comprises a reestablished network-connected mode.

14. A program storage device, readable by a machine, tangibly embodying a program of instructions executable by the machine to perform method steps for conducting disconnected transactions, between a pervasive computing device and a server, relating to a service application, the method comprising the steps of:
   receiving, at the pervasive computing device, a service contract from the server during a connected mode, the service contract specifying rules of interaction with the service application in a disconnected mode;
   executing, with the pervasive computing device, at least one transaction of the service application in the disconnected mode; and
   sending transaction information, in response to the executing step, to the server during a reestablished connected mode, whereby the at least one transaction is recorded as valid if compliance with the rules of interaction are verified by the server.

15. A system for conducting disconnected transactions with a server relating to a service application, comprising:
   means for receiving, at the pervasive computing device, a service contract from the server during a connected mode, the service contract specifying rules of interaction with the service application in a disconnected mode;
   means for executing, with the pervasive computing device, at least one transaction of the service application in the disconnected mode; and
   means for sending transaction information, in response to the executing step, to the server during a reestablished connected mode, whereby the at least one transaction is recorded as valid if compliance with the rules of interaction are verified by the server.

16. The system of claim 15 further comprising means for receiving a service program which enables a user of the pervasive computing device to interact with the service application consistent with the rules of interaction.

17. A method for facilitating disconnected transactions, between a pervasive computing device and a server, relating to a service application, the method comprising the steps of:

receiving, from the pervasive computing device a request for service application information;

presenting one or more service application options and associated service contracts to the pervasive computing device;

receiving, from the pervasive computing device, a service application selection;

sending, to the pervasive computing device, a service contract associated with the service application selection, the service contract specifying rules of interaction with the service application in a disconnected mode;

receiving, from the pervasive computing device, transaction information logged during the disconnected mode; and validating the transaction information.

18. The method of claim 17 further comprising the step of sending, to the pervasive computing device, a service program which enables a user of the pervasive computing device to interact with the service application consistent with the rules of interaction.

19. The method of claim 18 wherein the service program sending step comprises the step of receiving a service program which provides, to the user, user interfaces for interaction.

20. The method of claim 18 wherein the service program sending step comprises the step of receiving a service program which provides, to the user, program logic for service application actions.

21. The method of claim 18 wherein the service program sending step comprises the step of receiving a service program which provides, to the user, security features specified by the service contract to prevent tampering.

22. The method of claim 18 wherein the service program sending step comprises the step of receiving a service program which provides, to the user, alerts which facilitate successful completion of the at least one transaction.

23. The method of claim 18 wherein the service program is written to only enable interaction with the service application consistent with the rules of interaction of the service contract.

24. The method of claim 18 wherein the service program includes a common module written to enable interaction with the service application consistent with the rules of interaction of a plurality of service contracts when combined with specialized modules written for each service contract.

25. The method of claim 18 wherein the service program sending step comprises the step of sending a service contract to the pervasive computing device during a network-connected mode.

26. The method of claim 25 wherein the service contract sending step comprises the step of sending a service contract with an identification code identifying the service application or the server.

27. The method of claim 17 wherein the validating step comprises the step of comparing the transaction information to the rules of interaction specified by the service contract.

28. A program storage device, readable by a machine, tangibly embodying a program of instructions executable by the machine to perform method steps for facilitating disconnected transactions, between a pervasive computing device and a server, relating to a service application, the method comprising the steps of:

receiving, from the pervasive computing device a request for service application information;

presenting one or more service application options and associated service contracts to the pervasive computing device;

receiving, from the pervasive computing device, a service application selection;

sending, to the pervasive computing device, a service contract associated with the service application selection, the service contract specifying rules of interaction with the service application in a disconnected mode;

receiving, from the pervasive computing device, transaction information logged during the disconnected mode; and validating the transaction information.

29. A server system for facilitating disconnected transactions in a pervasive computing device relating to a service application, comprising:

means for receiving, from the pervasive computing device a request for service application information;

means for presenting one or more service application options and associated service contracts to the pervasive computing device;

means for receiving, from the pervasive computing device, a service application selection;

means for sending, to the pervasive computing device, a service contract associated with the service application selection;

means for receiving, from the pervasive computing device, transaction information logged during a disconnected mode; and means for validating the transaction information.

30. A disconnected transaction system for pervasive computing devices comprising:

a service provider server;

a pervasive computing device;

a communication network; and a service contract downloadable from the service provider server to the pervasive computing device over the communication network during a connected mode, the service contract specifying rules of interaction with a service application associated with the service contract and providing a service provider with a mechanism for validating, upon reconnection to the service provider server, at least one transaction of the service application performed by a user of the pervasive computing device during a disconnected mode.

31. The disconnected transaction system of claim 30 wherein the service contract specifies unambiguous rules of interaction with downloaded transaction information in the disconnected mode.

32. The disconnected transaction system of claim 30 further comprising a service program downloadable from the service provider server to the pervasive computing device over the communication network during a connected mode, the service program adapted to enable a user of the pervasive computing device to interact with the service application consistent with the rules of interaction.

33. The disconnected transaction system of claim 32 wherein the service program comprises user interfaces for interacting with the transaction information.

34. The disconnected transaction system of claim 33 wherein the service program comprises implementation logic which presents the user interfaces and computes the results of the actions.

35. The disconnected transaction system of claim 32 wherein the service program comprises security features that enable identification of the service provider server or the service contract.

36. The disconnected transaction system of claim 32 wherein the service program comprises alert features to assist the user in making decisions when the pervasive computing device is in the disconnected mode.

* * * * *